Dec. 20, 1960  F. P. DANIELS, JR  2,964,860
TREE BALLING MACHINES
Original Filed March 22, 1954  3 Sheets-Sheet 1

INVENTOR.
FRANC P. DANIELS, JR.
BY Moore, White & Burd
ATTORNEYS

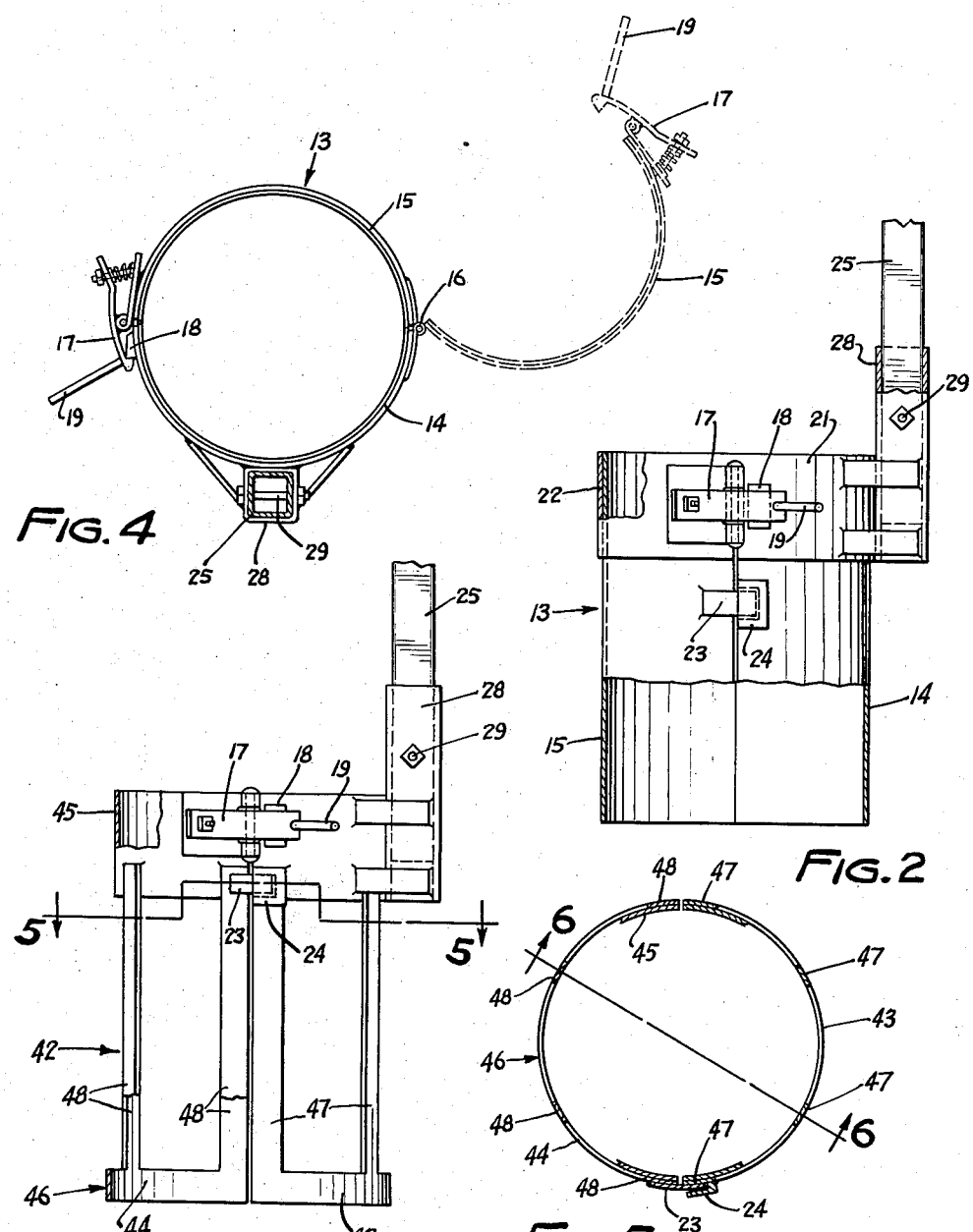

Dec. 20, 1960 F. P. DANIELS, JR 2,964,860
TREE BALLING MACHINES
Original Filed March 22, 1954 3 Sheets-Sheet 3
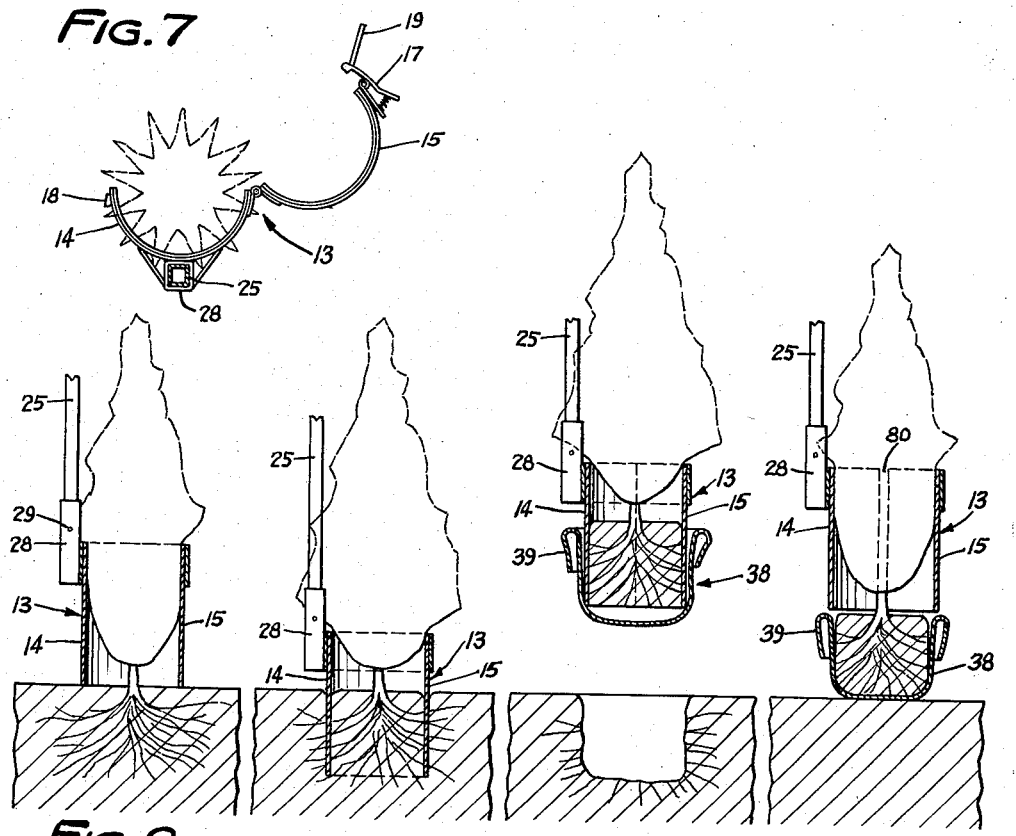
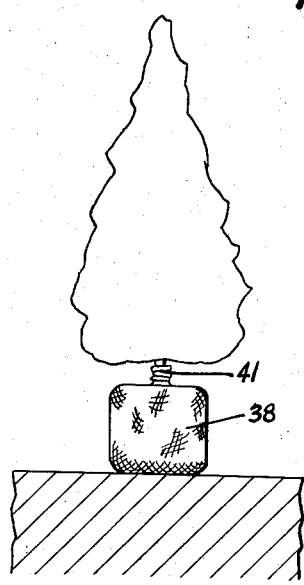
INVENTOR.
FRANC P. DANIELS, JR.
BY
ATTORNEYS

United States Patent Office 2,964,860
Patented Dec. 20, 1960

2,964,860

TREE BALLING MACHINES

Franc P. Daniels, Jr., Long Lake, Minn.

Original application Mar. 22, 1954, Ser. No. 417,849. Divided and this application May 6, 1959, Ser. No. 811,313

14 Claims. (Cl. 37—2)

This invention relates to new and useful improvements in tree balling machines (generally) and more specifically to an improved balling band.

It is well-known that certain nursery stock, particularly small evergreens, shrubs and other trees which are subsequently to be transplanted, should have their roots pruned during their early growth to provide a strong well developed root system, which, when balled or wrapped in a suitable enclosing member such as kraft paper or burlap, makes it possible to readily transport such plants from one place to another without danger of damaging the tree or plant by such transplanting.

It is now common practice to manually prune, or sever the roots of small evergreens and other plants which may subsequently require balling, with an ordinary spade, or other hand operated tool, to facilitate transplanting, which obviously is slow and tedious, and thus materially increases the cost of thus preparing the trees and plants for transplanting.

An object of the present invention, therefore, is to provide an apparatus for simplifying the operation of thus pruning, or trimming the roots around trees and other plants to prepare them for transplanting, and which apparatus may be utilized for lifting a plant or tree out of the ground and placing it in a position whereby the ball of earth removed with the roots of the tree may be conveniently wrapped in a suitable enclosing member, such as kraft paper, or burlap, as is well-known. Thus, by the use of the novel machine herein disclosed, the manual labor heretofore required to ball the roots of trees, shrubs and other small plants may be materially reduced, with the result that the operation of balling such plants or trees for transplanting, may be accomplished in a far more expeditious and economical manner than has heretofore been possible with conventional equipment.

A further object is to provide a balling machine comprising a power operated balling band which is substantially cylindrical in cross-section, and comprises two semi-cylindrical sections hinged together, whereby said sections, when in their normal closed position, cooperate to provide a cylindrical body open at both ends, which may readily be forced into the ground around the trunk of a tree or plant for the purpose of severing and pruning all of the roots extending outwardly from the axis of the tree.

A further object of the invention resides in the means provided for vertically translating the balling band, whereby it may quickly be maneuvered into position about a tree or plant, and forced into the ground to simultaneously prune or sever all of the horizontally disposed roots of the tree. If desired, the balling band may also be actuated to bodily lift the tree and ball of soil out of the ground to prepare it for transplanting.

A further object resides in the construction of the power operated vehicle upon which the balling band is mounted, whereby the machine may be driven over a row of seedlings, or plants with the wheels straddling a row of trees or plants with the assurance the body of the machine will not damage or injure the tops of the growing plants.

A further object is to provide a power operated balling machine comprising an upright supporting beam, or member to the lower end of which the balling band is fixedly secured, the upper end of said beam being pivotally connected to one end of a fluid-operated rocker mounted upon the tractor frame, and means being provided on the upright supporting beam of the balling band for driving the balling band into the ground, should the ground be too hard for the rocker on the tractor to force it into the ground.

Other objects of the invention reside in the unique construction of the balling band which is so constructed that it may readily be utilized in wet sticky soil; and in the provision of such an apparatus which is extremely efficient and practical in operation, and is so constructed that it may readily be maneuvered about between the trees or plants to facilitate positioning the balling band around the tree or plant to be balled or transplanted, without the necessity of tying up the foliage or lower branches of the tree, previously to balling, as is now required when balling trees by the old well-known methods.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 2 is an enlarged detail side elevation of the balling band, partially in section;

Figure 3 is a side elevation of a skeleton type balling band, for digging in sticky soils;

Figure 4 is an enlarged detail sectional view on the line 4—4 of Figure 1, showing the two sections of the balling band in their operative closed positions, the dotted lines indicating the pivoted section in open position;

Figure 5 is a sectional plan view on the line 5—5 of Figure 3;

Figure 7 is a view showing the balling band open, as when placing it about the lower portion of a tree or plant;

Figure 8 is a sectional view of the balling band, showing it positioned about the lower portion of a tree, about to be thrust or forced into the ground;

Figure 9 is a view similar to Figure 8, but showing the balling band partially thrust into the soil to sever the radial roots of the tree;

Figure 10 is a detail sectional view showing the balling band elevated to a position to lift the tree out of the ground, and the enclosing member positioned about the lower end of the balling band;

Figure 11 is a view similar to Figure 10, but showing the balling band removed from the ball of earth and the enclosing member, after which the balling band may be opened to permit its complete removal from the plant or tree; and Figure 12 illustrates the tree or plant after the balling operation 1 as been completed.

The present application is a division of my co-pending application, Serial No. 417,849, filed March 22, 1954, now abandoned.

Figure 1:
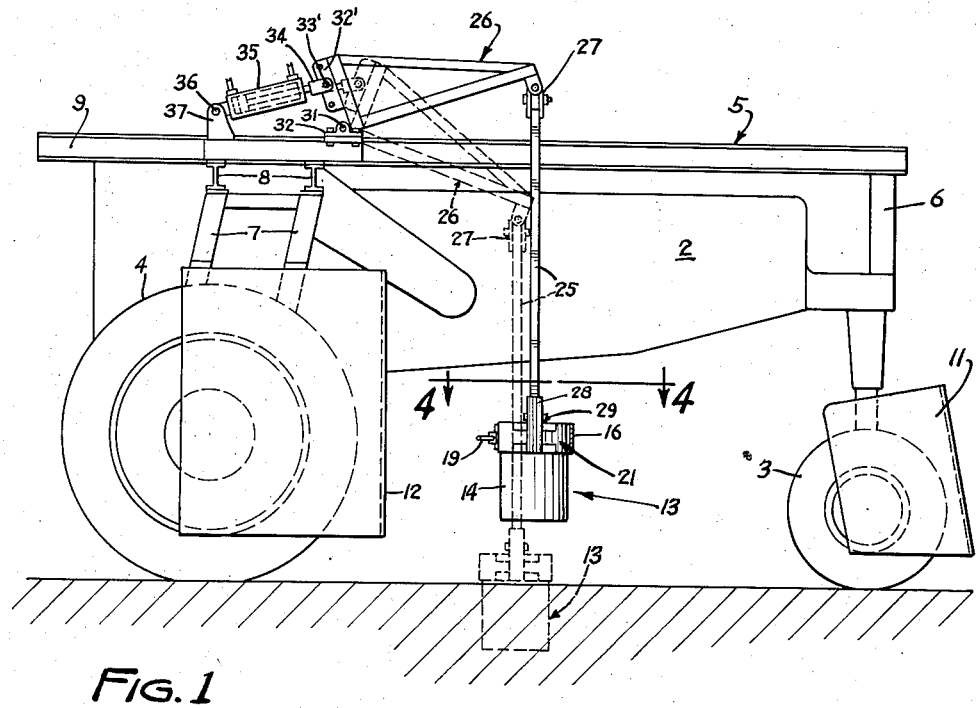
Figure 1 is a diagrammatic side elevational view of a tractor, showing the invention embodied therein, and some of the tractor parts being omitted.

In the selected embodiment of the invention herein disclosed, there is illustrated in Figure 1, for purposes of disclosure, a power unit or tractor comprising the usual body 2, front and rear wheels 3 and 4, and a structural supporting frame, generally designated by the numeral 5. The frame 5 is mounted on uprights 6 and 7, located respectively at the front and rear of the tractor body, as illustrated in Figure 1. The structural frame 5 also comprises cross members 8, and longitudinally extending frame members 9.

The machine herein disclosed is designed for straddling two plant rows, and its body 2 is so located between the rear wheels 4 as to provide adequate overhead clearance for small trees, shrubs and plants, over which it may be necessary to maneuver the apparatus when in use. Suitable guides 11 and 12 are provided forwardly of the front and rear wheels 3 and 4, respectively, to prevent the wheels from passing over overhanging branches, or portions of plants which may extend outwardly therefrom, when the tractor is propelled between the trees and other plants.

One of the important features of the present invention resides in the unique construction of the balling band, generally designated by the numeral 13. The balling band, illustrated in Figures 2, 3, 4, 5 and 6, comprises two sections pivotally connected together by a suitable hinge 16, whereby the balling band may be opened, as indicated by the dotted lines in Figure 4, and full lines in Figure 7 to facilitate placing it in position about a tree to be balled or transplanted, or to remove it from a tree. In Figures 1 and 2, the balling band is comprising two sections 14 and 15, which, when in their normal closed positions, as shown in full lines in Figure 4, cooperate to provide a slightly elongated cylindrical body, open at its top and bottom ends, whereby said body may be forced downwardly into the soil, or ground by exerting pressure on the upper end thereof.

A spring-biased latch 17 is shown carried by the pivoted section 15 of the balling band and is adapted to interlock with a keeper 18 secured to the fixed section 14 of the balling band, as clearly illustrated in Figure 4. The latch member 17 is shown provided with an operating handle 19.

The sections 14 and 15 of the balling band are provided at their upper ends with reinforcing elements 21 and 22 which are permanently secured to their respective band sections to provide, in effect, integral parts thereof. To retain the two sections 14 and 15 of the balling band in proper positions, when closed, as shown in Figures 2 and 4, a tongue element 23 is shown fixed to the pivoted section 15 adapted to be received in a socket member 24, secured to the relatively fixed member 14 thus cooperating with the hinge 16 to retain the two sections of the balling band in their proper positions when the balling band is closed, as illustrated in Figures 4 and 5 of the drawings.

The balling band 13 is secured to the lower end of an upright supporting beam or member 25, having its upper end pivotally connected to a rocker 26 by a universal coupling element, generally designated by the numeral 27. The lower end of the supporting beam 25 is received in a socket provided in a bracket 28 secured to the reinforcing band 21 of the balling band section 14 and fixed therein by such means as a bolt 29.

The rocker 26 is secured to a stub shaft 31 supported in bearings 32 secured to the structural frame 5, as indicated in Figure 1. The rocker is shown constructed of structural steel and is triangular in configuration and has its lower rear corner secured to the stub shaft 31 by such means as welding.

A connecting plate 32' is secured to the rear upright portion of rocker 26 and is apertured to selectively receive a coupling bolt 33' carried by the plunger 34 of a hydraulic cylinder 35, pivoted at 36 to a bracket 37 secured to the structural frame 5 of the tractor. Means, not shown in the drawings, is provided for conducting a pressure fluid to and from the cylinder 35 to control operation of the rocker 26. The plunger 34 is double-acting, whereby the rocker may be utilized for forcing the balling band 13 into the ground, or for withdrawing it therefrom.

When it is desired to prune or sever the outwardly extending roots of a small evergreen, or other tree or plant, the tractor is maneuvered into position to bring the balling band 13 into proper position, with respect to the tree to be balled. When thus maneuvering the balling band into position, the pivoted section 15 thereof is preferably swung open, as indicated in Figures 4 and 7. The fixed member or section 14 is then manually moved into proper position with respect to the tree by an operator manipulating the supporting beam 25 of the balling band, which, as hereinbefore stated, is suspended from the universal coupling 27 of the rocker 26.

When the fixed section 14 of the balling band has been maneuvered into proper position with respect to the tree to be balled, as illustrated in Figure 8, the attendant manipulating the beam 25 of the balling band will swing the hinged section 15 of the balling band into locking engagement with the fixed section 14, as shown in Figure 8. This is often done without previously tying up the foliage of the tree, as is now usually necessary with hand balling methods. The operator on the tractor then manipulates the control for the fluid supply to the cylinder 35, whereupon the rocket 26 is actuated to force the balling band into the soil to a depth at least equal to, or slightly below the lowermost horizontal roots of the tree, as indicated in Figure 9.

When the roots have thus been pruned, the balling band may be withdrawn from the ground, as indicated in Figure 11, to facilitate wrapping burlap, paper, or fitting a pre-formed pulp enclosing member 38 around the lower end of the soil-filled balling band, as shown in Figure 10. The ball of soil and roots may then be released from the balling band and placed on the ground in the position shown in Figure 12, after which the balling band may be completely removed from the tree or plant, as will be understood. If burlap or paper is utilized for balling the plant, the operator may wrap the upper portion 39 of the wrapper, or enclosing member 38 over the top of the ball of soil removed with the tree roots, as illustrated in Figure 12, it being understood that the enclosing member 38 has its upper end suitably secured in position around the ball of soil, by tying it to the trunk of the tree, as indicated at 41 in Figure 12, and by inserting spikes or pegs through the enclosing wrapper into the top portion of the ball of soil, as is well-known.

Figure 6:
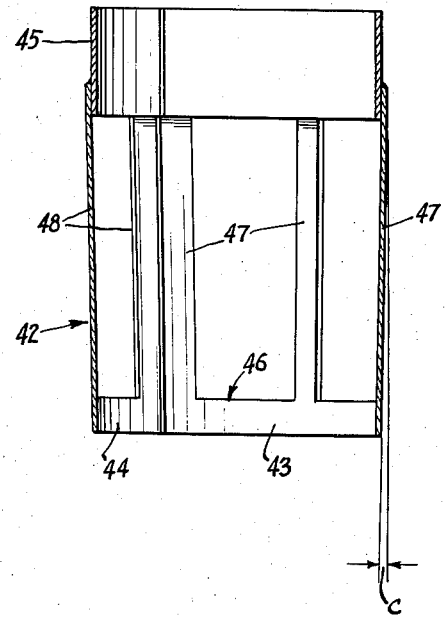
Figure 6 is a sectional elevation on the line 6—6 of Figure 5, showing the walls of the balling band slightly inwardly inclined in a downward direction.

Figures 3, 5, and 6 illustrate a balling band 42 designed for operating in wet, sticky clay soils in which it may be difficult to operate a balling band, such as shown in Figures 4 and 5. The balling band illustrated in Figures 3 and 5 comprises a fixed section 43 and pivoted section 44 which cooperate to provide an open skeleton-like body having its top, bottom, and sides open, as best illustrated in Figure 3. The upper and lower annular portions 45 and 46 of the balling band 42 are connected together by upright strap-like members 47 and 48, and the lower end of the balling band is preferably slightly smaller in diameter than its upper end, as indicated at C in Figure 6. By thus making the lower end of the composite band slightly smaller in diameter than its upper end, there is less tendency for the ball of soil and the tree to drop out of the balling band, when lifting the balling band and tree out of the ground, as shown in Figure 10.

The open or skeleton-like balling band shown in Figures 3, 5 and 6, is substantially self-cleaning, even when operating in wet, sticky soils, thereby eliminating the tedious task of periodically having to manually scrape and clean the walls of the balling band, as when using a band having imperforate walls, as illustrated in Figures 1, 2 and 4.

The novel apparatus herein disclosed has been found extremely practical and efficient in the operation of balling small trees and plants for subsequent transplanting. The balling band is pendently supported from the rocker 26 and may readily be maneuvered into position around a tree or plant by an attendant walking on the ground along side the tractor. When the balling band has been maneuvered into position around the tree, as shown in Figure 8, the operator on the tractor admits fluid into cylinder 35 to project the piston rod or plunger 34 outwardly to depress rocker 26 to the dotted line position indicated in Figure 1, whereupon the balling band, under normal operating conditions, is forced into the ground, as indicated by the dotted lines in Figure 10. By thus forcing the balling band into the ground, the lower edge thereof severs all of the horizontally disposed roots engaged thereby, as will be understood by reference to Figures 9 and 10.

In the next step of balling a tree, the balling band and the tree to be balled are bodily lifted out of the ground, as shown in Figure 10, and a suitable cover member 38, which may be paper, burlap, or a preformed container is then fitted over the lower end of the balling band, as shown in Figure 10, after which the balling band is lowered to the position shown in Figure 11. The operator next manipulates the latch handle 19 to release the latch and permit the balling band to partially open, as indicated at 80 in Figure 11, whereby the ball of soil and the tree are released from the balling band and drop by gravity into the enclosing member or container 38. The balling band may then be fully opened, as indicated in Figure 7, to permit completion of the balling operation by the application of a burlap wrapper or other enclosing member 38 to the ball of soil 9 roots, as indicated in Figure 12, and as well-known in the art. When so completed, the balled evergreen or tree may be reset in the ground for subsequent transplanting.

There is now available to the trade large containers made from paper pulp, which simulate flower pots. These containers have found a ready market among nursery men when utilizing a balling band such as herein disclosed, in that such containers may readily be picked up bodily by the balling band, whether submerged in the ground, or placed on top thereof and maneuvered into any desired position with a minimum of labor.

It is to be understood that the material utilized for wrapping and enclosing the ball of earth and roots is made from a material which readily deteriorates, when submerged in the soil, whereby the enclosing member or wrapper need not be removed from the ball of earth and roots before the planting operation.

The foregoing detailed description has been given for clearness of understanding only, and no unnecessary limitations should be understood therefrom, and the appended claims should be construed as broadly as permissible in view of the prior art.

I claim as my invention:

1. A balling band comprising two semi-cylindrical sections having adjacent edges pivotally connected together, whereby the balling band may be opened to facilitate positioning the band around a tree or plant, a spring-biased latch carried by one of said sections adjacent the upper end thereof and arranged to interlock with complemental means on the other of said sections, thereby to secure the sections in closed position, a tongue element carried by one of said sections adjacent its said edge, and a socket member carried by the other of said sections adjacent its said edge and receiving said tongue element therewithin when said sections are in closed position to aid in retaining the two sections in their proper relative positions.

2. A balling band comprising two open framework sections each substantially semi-cylindrical throughout its entire length and each comprising a lower semi-cylindrical strap-like member and a vertically spaced upper relatively wider strap-like member, said elements being fixedly secured together by upright, circumferentially spaced narrow strap elements to provide a composite skeleton-like body, and means for hingedly connecting together said sections.

3. A balling band according to claim 2, wherein the bottom end of the balling band is only slightly smaller in diameter than the upper end thereof.

4. An open skeleton-like balling band comprising two like sections connected together along a vertical axis, each section having an imperforate horizontal member defining the lower end portion thereof, and an upper imperforate member forming the upper end portion thereof, and means secured to one side only of the upper end of one of said sections for maneuvering the composite balling band into position about a tree and thereafter forcing the band into the ground about the tree.

5. In an apparatus of the class described, a mobile frame having a rocker mounted thereon, a balling band open at its top and bottom ends and having a rigid upright member secured thereto, and means pivotally connecting the upper end of said upright member to the rocker, whereby the balling band may be forced downwardly into the ground about a tree or plant, said balling band comprising upper and lower annular members secured together solely by circumferentially spaced upright strap-like members, thereby to provide an open skeleton-like composite balling band.

6. An apparatus according to claim 5, wherein the balling band is composed of two semi-cylindrical vertical sections pivotally hinged together along a vertical axis, whereby the balling band may be opened to facilitate placing it about a tree or plant.

7. A balling band comprising two open frame-work sections each substantially semi-cylindrical throughout its entire length and each comprising a lower semi-cylindrical rigid strap-like member and a vertically spaced upper relatively wide rigid strap-like member, said elements being fixedly secured together by a plurality of upright circumferentially spaced narrow rigid strap elements to provide a rigid composite skeleton-like body, said open framework sections having adjacent edges pivotally connected together.

8. The structure defined in claim 7 wherein said sections have upper and lower end portions and taper inwardly very slightly toward their lower end portion.

9. The structure defined in claim 7 and elongated rigid support means secured to the exterior surface of only one of said sections and supporting the entire band solely.

10. A tree balling device comprising a mobile frame having a rocker mounted thereon, a balling band open at its top and bottom ends, a rigid upright support member secured to said balling band at one side only thereof, and coupling means universally connecting the upper end of said upright member to the rocker whereby said balling band may be swung laterally and forwardly and rearwardly relative to the longitudinal center of said mobile frame to permit the balling band to be placed about a tree or plant which is out of alignment of its row and to be forced downwardly into the ground thereabout whereby the tree and the earth therearound may be removed from the ground.

11. The structure defined in claim 10 wherein said balling band is capable of being supported by said support member at opposite sides of the longitudinal axis of said upright member whereby greater leeway with respect to the position of a tree to be dug relative to said frame is permitted.

12. An open skeleton-like balling band comprising two like sections connected together along a vertical axis, each of said sections having a rigid elongated curved narrow band defining the lower end portion thereof and extending vertically in cross section, and having a vertically spaced rigid curved horizontally extending band defining the upper portion thereof and extending vertically in cross section, and rigid support means rigidly secured to one side only of the upper end of one of said sections for maneuvering the composite balling band into position about a tree and thereafter forcing the band into the ground about the tree.

13. In a tree balling device, a mobile frame having a rocker mounted thereon and disposed laterally relative to the longitudinal center of said frame, said frame having rear wheels disposed outwardly of said rocker relative to said frame, a balling band open at its upper and bottom ends, a rigid upright support member secured to the upper end of said balling band at one side only thereof and supporting the same, a universal coupling means connecting the upper end of said upright member to said rocker whereby said balling band may be forced downwardly into the ground about a tree or plant even though the latter is located a considerable distance forwardly or rearwardly of said coupling means and laterally of a line extending through said coupling means and parallel to the longitudinal center of said frame.

14. The structure defined in claim 13 wherein said balling band is adjustably secured to the lower end portion of said support member to permit the same to be disposed at opposite positions relative to the longitudinal axis of said support member whereby the facility of the composite device to dig a tree within a wide area relative to said universal coupling is substantially enhanced.

References Cited in the file of this patent

UNITED STATES PATENTS

| | | |
|---|---|---|
| 310,592 | Johnson | Jan. 13, 1885 |
| 357,197 | Harsin | Feb. 8, 1887 |
| 879,613 | Edwards | Feb. 18, 1908 |
| 1,011,198 | Holmes | Dec. 12, 1911 |
| 1,038,924 | Matthews | Sept. 17, 1912 |
| 1,052,367 | Neil | Feb. 4, 1913 |
| 1,162,126 | Bates | Nov. 30, 1915 |
| 2,035,980 | Pope | Mar. 31, 1936 |
| 2,669,065 | Clegg | Feb. 16, 1954 |
| 2,775,428 | Monthan | Dec. 25, 1956 |